# United States Patent [19]

Cheney et al.

[11] 4,427,704

[45] Jan. 24, 1984

[54] FOOD PRODUCT THICKENED OR GELLED WITH CARRAGEENAN AND GLUCOMANNAN

[75] Inventors: Peter A. Cheney, Anstey; John Stares, Melton Mowbray, both of England; Alan J. Vernon, Brea, Calif.

[73] Assignee: Mars Limited, London, England

[21] Appl. No.: 341,008

[22] Filed: Jan. 20, 1982

Related U.S. Application Data

[63] Continuation-in-part of Ser. No. 138,726, Apr. 9, 1980, abandoned, and Ser. No. 310,281, Oct. 9, 1981, abandoned.

[30] Foreign Application Priority Data

Apr. 11, 1979 [GB] United Kingdom ............... 7912816
Oct. 9, 1980 [GB] United Kingdom ............... 8032684

[51] Int. Cl.$^3$ .............................................. A23G 1/00
[52] U.S. Cl. ................................... 426/104; 426/573; 426/574; 426/575; 426/656; 426/657
[58] Field of Search .............. 426/615, 640, 630, 573, 426/574, 575, 104, 802; 536/114

[56] References Cited

U.S. PATENT DOCUMENTS

| | | | |
|---|---|---|---|
| 3,342,612 | 9/1967 | Foster et al. | 99/131 |
| 3,445,243 | 5/1969 | Moirano | 99/131 |
| 3,658,556 | 4/1972 | Klein et al. | 99/131 |
| 3,767,424 | 10/1973 | Shimizu et al. | 426/640 |
| 3,804,951 | 4/1974 | Rapp | 426/167 |
| 3,898,345 | 8/1975 | Horrocks et al. | 426/104 |
| 4,200,661 | 4/1980 | Brigand et al. | 426/573 |
| 4,242,367 | 12/1980 | Igoe | 426/573 |

FOREIGN PATENT DOCUMENTS

| | | | |
|---|---|---|---|
| 494068 | 6/1953 | Canada | 536/114 |
| 1071011 | 2/1980 | Canada . | |
| 46-74311 | 12/1971 | Japan | 426/573 |
| 51-147989 | 2/1976 | Japan | 426/573 |
| 52-57362 | 5/1977 | Japan | 426/641 |
| 53-78348 | 1/1978 | Japan | 426/573 |
| 55-45173 | 11/1980 | Japan | 426/573 |
| 840728 | 1/1975 | U.S.S.R. | 426/640 |

OTHER PUBLICATIONS

Report of Japanese Devil's Tongue Assn. No. 85, (Aug. 5, 1977).

*Primary Examiner*—Jeanette M. Hunter
*Attorney, Agent, or Firm*—Curtis, Morris & Safford

[57] ABSTRACT

What are disclosed are edible materials containing a thickened or gelled phase comprising a mixture or a reaction product of at least one carrageenan and at least one glucomannan, wherein the gelled phase may be either a thermo-irreversible gel or a thermo-reversible gel and the pH of the edible material is below 8.

27 Claims, No Drawings

FOOD PRODUCT THICKENED OR GELLED WITH CARRAGEENAN AND GLUCOMANNAN

This application is a continuation-in-part of application Ser. No. 138,726 filed Apr. 9, 1980 and now abandoned and of application Ser. No. 310,281 filed Oct. 9, 1981 and now abandoned.

This invention relates to food products and, especially to a gelling system for use in the preparation of gelled or thickened food products.

A variety of gelling, binding and thickening agents, are used in the food and confectionary industries to impart desired textural and aesthetic qualities to foodstuffs including, for example, meat loaves, canned pie fillings, petfoods, ice cream, yoghurts, formed fruit pieces, etc.

It is known that glucomannans such as those extracted from the Amorphophallus sp. for example *A. konjac*, when treated with alkalis react to form a very tough thermo-irreversible gel. The pH required for this gelling reaction is at least 9 and a pH greatly in excess of 9 is frequently used. It is widely believed that calcium ions are also essential for this process.

It is also known that gels can be formed using for example pectins and seaweed extracts such as alginates and agar. Alginates and pectates normally form thermo-irreversible gels in the presence of divalent ions. The reaction rate and strength of these thermo-irreversible gels increases with decreasing pH. By control of divalent ion availability, which is itself pH dependent, a thermo-reversible gel can be produced using pectates.

Certain forms of carrageenan, especially kappa and iota carrageenans, but not lambda-carrageenan, can also be used to form gels. These gels are thermo-reversible and although carrageenans can form gels at low pH, the gels are readily hydrolysed if heated at temperatures in excess of 100 degrees Centrigrade at pH values below 7. The extent of hydrolysis is very pH dependent increasing sharply with decreasing pH.

It is further known that there is an interaction between kappa carrageenan and locust beam gum (carob gum) which results in enhanced viscosity development and gelation properties. A mixture of carob gum and carrageenan is widely used to provide viscous gravies, in for example canned pie fillings, and thermo-reversible gels in for example canned petfoods, brawns and table jellies. An additional advantage of the interaction is that the carrageenan gel texture is modified to provide additional desirable characteristics such as reduced brittleness and increased softness.

In contrast to the thermo-irreversible gels of calcium alginate and calcium polypectate, carrageenan/carob gum mixtures cannot be used to provide structure in formed products which are to be subjected to heating above the melting point of the gel system. Thus, for example the carrageenan/carob gum gelling system cannot form the basis of a formed chunk in a product which requires to be heated above the melting point of the gelling system since the chunk disintegrates on melting of the gel.

Until now, carob gum has been thought to be unique in its ability to enhance the gelling or thickening properties of carrageenan. Although, like carob gum, guar gum and tara gum are galactomannans, their interaction with carrageenans is considerably less than that of carob gum and these polysaccharides are of little use in this context.

It has been proposed in Japanese published patent application No. 1978/52648 to produce a gelled seaweed food by blending dissolved or colloidal seaweed with dissolved Devils Tongue material (a glucomannan containing material). The blend is caused to gel by the normal method for gelling glucomannan, namely, the addition of alkali. The gel is a thermo-irreversible gel.

The presence of high alkalinity in food products is generally undesirable and accordingly the presence of a thickened or gelled phase which has been produced at high pH in most food products is very unacceptable.

This invention is based on the observation that in complete contrast to the teaching of the prior art, glucomannans can be caused to form gels at a pH not higher than 8 in a gelling system in which they are present with a carrageenan.

Parent application Ser. No. 138,726 filed Apr. 9, 1980 and now abandoned teaches that thermo-irreversible gels can be produced by reacting a mixture of at least one glucomannan and at least one carrageenan at a temperature of at least 100° C. for a sufficient period of time provided that the pH is at least 5 but that in the presence of certain foodstuffs, especially meat and other proteinaceous materials the gels formed under the same conditions are thermo-reversible. Later filed patent application Ser. No. 310,281 filed Oct. 9, 1981 and now abandoned teaches that by suitably adjusting the conditions of gel formation thermo-irreversible gels can be produced, when the pH of the aqueous phase is between 5 and 8, whether or not the temperature is above 100° C. and whether or not meats and other proteinaceous materials are present in the aqueous phase. More in particular, thermo-irreversible gels can be produced using a carrageenan/glucomannan reaction system when the pH is between 5 and 8 provided that the heat input is sufficient, even though the temperature of the system is not raised above 100° C. and/or proteinaceous material of veyetable or animal origin is present.

Thus the gels which can be formed may be thermo-reversible or thermo-irreversible depending on the treatment to which the gelling system is subjected.

While the mechanism of gel formation is not fully understood, the degree of gel formation and the type of gel formed appears to be governed, inter alia, by pH, the glucomannan and carrageenan content (the "gum" content) and the heat input.

At pH values below 5.0, the glucomannan/carrageenan system always produces a thermo-reversible gel.

It has been observed however that in the presence of certain foodstuffs, for example meats and other proteinaceous materials of both vegetable and animal origin, the pH below which it is generally impossible to produce thermo-irreversible gels seems to be somewhat higher. This may be due to the inherent acidity of the proteinaceous materials but it appears that generally speaking for the formation of a thermo-irreversible gel in the presence of meat and other proteinaceous materials the pH should be at least 6.3 to 6.4. The thermo-reversible gels can be formed simply by incorporating a mixture of powdered glucomannan and carrageenan in hot water or can be formed in complex systems such as sterilised canned meat products. For thermo-irreversible gels however the gelling system must be subjected to a heat input which is at least equivalent to heating the gelling system to a temperature of at least 50° C. for a period of up to 16 hours, the particular time needed for gel formation depending basically on the temperature, when all other conditions are equal. Under the heating conditions normally applied in the heat sterilisation of canned food products, for example 110° to 130° C. for 50 to 60 minutes, a thermo-irreversible gel will normally be formed with a total gum content as low as 1% when the pH is between 6.3 and 8. As indicated hereinbefore however for thermo-irreversible gel formation it appears to be essential that the pH is above 5 but apart from this the heat input can be lower, the closer the pH is to 8 and the higher the concentration of gellable constituents in the aqueous phase of the system. The higher the temperature, of course, the shorter the heating period required to form a thermo-irreversible gel.

Surprisingly, moreover, it has been found that the time to form a thermo-irreversible gel can be greatly reduced, when all other factors are the same, if the gelling system, having been produced by dissolving the ingredients in a hot aqueous phase, is cooled and subjected to an ageing process at room temperature before it is reheated to form the gel.

It has also been found that the presence of certain other ingredients in the gelling system affects either the heat input required to form a gel or the toughness of the gel obtained for a given heat input. Thus, for example the presence of potassium ions in the gelling system produces a marked increase in the toughness of the gel, as also does the presence of carob gum in addition to the other gum ingredients.

The invention provides a food product having a pH not higher than 8 comprising a gelled or thickened aqueous phase containing a mixture or a reaction product of at least one gluocomannan and at least one carrageenan.

The invention also provides a process for the production of an edible product having a pH between 5 and 8 and having a gelled aqueous phase provided by a mixture of at least one glucomannan and at least one carrageenan, which comprises subjecting a gellable combination to a temperature of at least 50° C. for a period of up to 16 hours such as to form a thermo-irreversible gel in the aqueous phase.

The invention further provides a meat analogue comprising proteinaceous material dispersed in and bound together by a thermo-irreversible gelled aqueous phase, wherein the gelling system comprised a mixture of at least one glucomannan and at least one carrageenan.

Any carrageenan or carrageenan-type polysaccharide, for example, furcellaran is suitable. The carrageenan may be used in a crude form (e.g. washed seaweed) or in an alkaline modified form or in the form of the conventional carrageenan extracts of commerce. The carrageenan may be any form of carrageenan such as lambda, iota or kappa carrageenan or any mixture thereof, but the preferred carrageenan types are those containing some kappa carrageenan.

The glucomannans may be used in a purified form or in the crude form. The crude form may merely be the ground source of gluocmannan without further treatment. Although and glucomannan is suitable, the preferred gluocmannans, mainly because they are only ones that are readily commercially available, are those that are found in the corms of the Amorphophallus genus and in particular in the corms of *A. rivieri* (Syn *A. Konjac*), *A. oncophyllus*, *A. variabilis*, *A. bulbifera* and *A. blumei*.

The preferred ratio of glucomannan to carrageenan is in the range of 20:1 to 1:20 and the preferred concentration of the combined mixture in the aqueous phase is 0.01% to 5%, preferably 0.5 to 5% by weight.

The product of the invention is an edible material having a pH not higher than 8, which is structured, or shaped, or bound, substantially by a gel matrix produced from a mixture of glucomannan and carrageenan in the aqueous phase.

The edible material of the invention may be any foodstuff or confectionery in which it is desired to have a gelled or thickened phase. As a thermo-irreversible gel the food product may comprise, for example a gelled chunk which with the addition of flavouring and colourings or other similar food materials may be used as a meat analogue and in this form the material may have a texture very similar to cooked lung. Preferably, as a thermo-irreversible gel, however, the gel serves as a binder for a meat analogue comprising meat or other proteinaceous material dispersed in and bound together by the gelled aqueous phase. As a thermo-reversible gel the edible material may be for example a meat-in-jelly petfood or at very acid pH down to about say 3 a thermo-reversible gel may be present in gelled deserts and confectionery, especially fruit based products in which the fruit acids considerably lower the pH.

The edible product of this invention may be any foodstuff or confectionery in which it is desired to have a structured or shaped form which is resistent to structural breakdown upon heating. The gelled foodstuff may include flavouring, and colouring ingredients. If desired, humectants and fungistats may be included to provide microbiological stability in, for example, so-called "semi-moist" foods. A major advantage of the gelling system over other polysaccharide gelling systems such as alginates and polypectates is that there is no necessity for treatment with divalent or polyvalent ions, a process which often imparts a palatability negative to the product unless an efficient washing stage is included.

Another advantage of the gelling system over calcium alginates lies in the stability of the glucomannan/carrageenan gels to heating in the presence of polyphosphates. Food analogues structured by calcium alginate soften considerably when heated in the presence of polyphosphates whereas the products of this invention do not. This is particularly useful for meat analogues which are to be included in common convenience foods since these often contain polyphosphates.

Yet another advantage of the gelling system used in this invention is that it is odourless and flavourless even after severe heat treatment. This is in marked contrast to many vegetable protein binders such as the soya, cottonseed, and wheat proteins used in commerce. The gelling system of the invention does not therefore contribute a palatability negative to the foodstuff in which it is included.

The following Examples illustrate the invention. In the Examples the carrageenans were commercially available samples of the type specified and the Amorphophallus sp. extract contains approximately 90% glucomannan.

EXAMPLES

1. Thermo-reversible gels.

A petfood product was prepared to the following recipe:

| | INGREDIENT | % by weight |
|---|---|---|
| "Meats" | Offal Meats | 40 |
| | Fibrous Muscle Meat | 16 |
| | Hydrated T.V.P. | 10 |
| | Condensed Whey | 3 |
| "Gravy" | Dye Solutions | 0.7 |
| | Water | 29.09 |
| | Potassium Chloride | 0.5 |
| | Kappa-carrageenan | 0.16 |
| | Carob gum (Industrial Grade) | 0.55 |
| | | 100.00 |

The gravy was prepared by mixing all the ingredients at room temperature using a high shear stirrer. Sufficient alkali was added to the gravy in order to maintain a final product pH of 6.2. The gravy was then added to the coarsly chopped "meats" and the product was filled into metal cans, which were sealed and heat sterilised in a pressure cooker @ 130° C. for 60 minutes after which time the cans were immersed in cold water for half an hour. The product was examined after 1 day.

A similar product was prepared but instead of the 0.16% carrageenan and 0.55% carob gum added to the gravy, 0.11% carrageenan and 0.55% glucomannan extracted from Amorphophallus sp. was used.

Upon examination the products were assessed to be similar in appearance, taste and firmness. The product containing flucomannan/carrageenan was rated as tougher to cut than the control containing carob gum/carrageenan even though the carrageenan level was lower.

The pH of both products was 6.2.

Both gels were thermo-reversible each melting at 75° C. and setting at 42° C. and 52° C., respectively.

EXAMPLE 2

This example demonstrates the greater stability of glucomannan/carrageenan solutions to heating at low pH.

The process of Example 1 was repeated using the following recipe.

| | INGREDIENT | CONTROL PRODUCT % by weight | TEST PRODUCT % by weight |
|---|---|---|---|
| Meat | Offal Meats | 37 | 37 |
| | Fibrous Muscle Meat | 16 | 16 |
| | Hydrated T.V.P. | 10 | 10 |
| | Condensed Whey | 6 | 6 |
| Gravy | Dye Solutions | 0.7 | 0.7 |
| | Water | 29.09 | 29.09 |
| | Potassium Chloride | 0.5 | 0.5 |
| | Kappa carrageenan | 0.16 | 0.16 |
| | Carob gum (Industrial Grade) | 0.55 | — |
| | Amorphophallus sp. extract | — | 0.55 |
| | | 100.00 | 100.00 |

The pH of both products was 5.7.

The control product containing carob gum barely supported its own weight and consisted of meats surrounded by low areas of very weak gel slurry and a large quantity of free water liquid. This is typical of the degradation of this gelling system subjected to high temperatures at relatively low pH.

In contrast the product containing glucomannan was an integral solid meat and jelly pack, self supporting and containing areas of clear, soft, tough gel without syneresis.

EXAMPLE 3

This Example demonstrates the preparation of a "formed" solid which is stable to heat in a thermo-irreversible structure using carrageenan/glucomannan.

A 6.8 pH buffer solution was prepared using;

| | |
|---|---|
| 0.4% NaH$_2$PO$_4$   2H$_2$O | |
| 0.44% Na$_2$HPO$_4$ | In distilled water |
| 0.2% KCl | |

2 parts of kappa carrageenan and 5 parts of Amorphophallus sp. extract were dispersed in 1000 parts of the buffer solution ahnd heated to the boil with stirring.

The dispersion was heated in an autoclave at 130° C. for 50 minutes. After removal from the autoclave the resulting firm, very tough, solid was cut into chunks. The chunks exhibited remarkable resistance to shearing forces and had a texture similar to cooked lung. With the addition of flavourings and colourings the chunks make an excellent meat analogue.

The chunks were heat sterilised in water in sealed cans at 130° C. for 1 hour. The chunks retained their separate identity demonstrating thermo-irreversibility of the gel.

EXAMPLE 4

This example demonstrates the use of different carrageenans.

(a) Use of Iota carrageenan

The process of Example 1 was repeated using the following recipe:

| INGREDIENT | CONTROL PRODUCT % by weight | TEST PRODUCT % by weight |
|---|---|---|
| Offal Meats | 37 | 37 |
| Fibrous Meat | 7 | 7 |
| Hydrated T.V.P. | 26 | 26 |
| Dye solutions | 1.5 | 1.5 |
| Water | 27.4 | 27.0 |
| Sodium Chloride | 0.4 | 0.4 |
| Calcium Hydroxide | 0.1 | 0.1 |
| Iota Carrageenan | 0.6 | 0.6 |
| Amorphophallus sp. extract | — | 0.4 |
| pH | 6.1 | 6.3 |

The control product containing no glucomannan was barely integral just supporting its own weight. The pack readily broke down under slight pressure to reveal glossy meat in a viscous gravy. There were small areas of a very weak paste-like gel.

In contrast, the product containing the glucomannan was integral easily supporting its own weight. This pack had significant areas of an elastic clear glossy gel.

(b) Use of Lambda Carrageenan

The process of example 1 was repeated except that:

In the control product the carrageenan and carob gum were replaced by 0.5% Lambda carrageenan and the difference was corrected for adjustment of the water content. The pH of the product was 6.6.

In the test product the carrageenan and carob gum were replaced by 0.5% Lambda carrageenan and 0.4% Amorphophallus sp. extract. Again the recipe was corrected by adjustment of water content. The pH of the product was 6.8.

The control was a non-self supporting meat in gravy product. The gravy was viscous, glossy and clear.

The product containing the glucomannan was firmer and more resistant to rupture and had some areas of clear gel.

EXAMPLE 5

This example demonstrates the use of different types of glucomannan source.

Example 1 was repeated with the carrageenan and carob gum replaced by the following ingredients:

In product A, *Amorphophallus oncophyllus* extract (0.31%) and kappa carrageenan (0.32%) were used (pH 6.8).

In product B, the process and recipe of product A was repeated but replacing the 0.31% *A. oncophyllus* extract by 0.25% *A. rivieri* extract (pH 6.7).

In product C, the process and recipe of product A was repeated but replacing the 0.31% *A. oncophyllus* extract by 0.31% glucomannan from Indonesian Amorphophallus sp. extract prepared by the process described in Japanese published patent application No. 1979/49346 (pH6.8).

Examination of the finished products after the day showed that all three were virtually identical being integral solid meat and jelly packs, self supporting and containing areas of clear, soft, tough gel without syneresis.

EXAMPLE 6

This example demonstrates the interaction between glucomannan and carrageenan to produce thermo-irreversible gels under different pH conditions.

1. Buffer solutions at pH values of 5.5, 6.5, and 7.0 were prepared to the following formation:

| pH | mg Na$_2$HPO$_4$ | mg NaH$_2$PO$_4$ |
|---|---|---|
| 5.5 | 205 | 4795 |
| 6.5 | 1615 | 3385 |
| 7.0 | 3090 | 1910 |

Each of the above dry salt mixtures was dissolved in 500 ml of distilled water.

Kappa carrageenan was dissolved in each buffer at 80° C. at a concentration of 1% w/v.

Once the carrageenan has dissolved, 1% glucomannan as used in Example 5 product C is added while mixing with a high shear mixer.

The solutions were sealed in cans, heat sterilised at 130° C. for 1 hour, cooled and examined.

For comparison purposes, the above exercise was repeated replacing the two gums by 1% of the glucomannan along in one case and by 1% kappa carrageenan alone in the second case.

The results obtained are noted below.

|  | 1% kappa-carrageenan | 1% glucomannan | 1% kappa-carrageenan and 1% glucomannan |
|---|---|---|---|
| pH 5.5 | Thin solution | Slightly viscous solution | Tough, slightly brittle gel; similar texture to alginate gels |
| 6.5 | Very weak, brittle gel; Excess syneresis | Viscous solution | Tough brittle gel |
| 7.0 | Weak, brittle gel; some syneresis | Viscous solution; some very weak gel pieces present | Tough brittle gel |

The gels produced using 1% glucomannan in conjunction with 1% kappa carrageenan were cut into chunks and canned in water. These were then re-processed at 130° C. for 1 hour.

After re-processing, the chunks remained integral and discrete.

EXAMPLE 7

This example relates to a chocolate jellied-milk.

| RECIPE | TEST PRODUCT | CONTROL |
|---|---|---|
| Calcium Sulphate | 0.50 g | 0.50 g |
| Potassium citrate | 1.25 g | 1.25 g |
| Sugar | 77.00 g | 77.00 g |
| Chocolate powder | 10.00 g | 10.00 g |
| Low methoxyl pectin (DE of 30–50%) | 2.00 g | 2.00 g |
| Potassium-sensitive carrageenan | 0.62 g | 0.62 g |
| Calcium-sensitive carrageenan | 1.19 g | 1.19 g |
| Glucomannan as used in Example 5 product C | 0.95 g | — |
| Carob gum (Industrial Grade) | — | 0.95 g |

The above dry powders were weighed out and mixed together.

570 ml of milk was then heated to 85° C. and the dry powders were whisked in using an egg-whisk.

The resulting mixture was then allowed to set at room temperature for 2–3 hours, to form the product.

The recipe allows by the addition of preservatives, flavours and food-grade colours although these are not included in the recipe as given.

The control product, containing carob gum was a neutral (pH 6.1) chocolate-flavoured dessert gel that cut cleanly with a spoon. There was some syneresis. The product containing glucomannan had a pH of 5.97 and a similar texture but showed no syneresis.

EXAMPLE 8

This example relates to a fruit-flavoured dessert gel and demonstrates the use of glucomannans in low pH food systems.

| RECIPE | TEST PRODUCT | CONTROL |
|---|---|---|
| Calcium sulphate | 0.5 g | 0.5 g |
| Adipic acid | 2.5 g | 2.5 g |
| Potassium citrate | 1.25 g | 1.25 g |
| Sugar | 77.00 g | 77.00 g |
| Low methoxyl pectin (DE 30–50%) | 2.00 g | 2.00 g |
| Potassium-sensitive carrageenan | 0.62 g | 0.62 g |

| RECIPE | TEST PRODUCT | CONTROL |
| --- | --- | --- |
| Calcium-sensitive carrageenan | 1.19 g | 1.19 g |
| Glucomannan as used in Example 5 product C | 0.95 g | — |
| Carob gum (Industrial Grade) | — | 0.95 g |

The above powders were weighed out and mixed together.

570 ml of pineapple juice was heated to 85° C. and the dry powders incorporated with an egg whisk.

The resulting mixture was then allowed to set for 2-3 hours at room temperature to form the product.

The formation allows for the addition of preservatives, flavours and food-grade colours as required although these are not included in the recipe above.

The control product containing carob gum was an acidic (pH 3.3) pineapple-flavoured dessert gel that cut cleanly with a spoon. There was some syneresis. The product containing glucomannan had a pH of 3.3 and a similar texture but showed no syneresis.

EXAMPLE 9

This example demonstrates the preparation of a typical thermally irreversible meat analogue product. The meat analogue product was prepared using the following recipe:

| | INGREDIENTS | % by Weight |
| --- | --- | --- |
| Meats | Fibrous Muscle Meats | 27.3 |
| | Offal Meats | 16.2 |
| | Ground Bone | 6.5 |
| Gravy | Amorphophallus sp. extract | 1.5 |
| | Kappa - carrageenan | 1.0 |
| | Water | 47.5 |
| | | 100.00 |

The meats were coarsely chopped and then mixed in the proportions given above, before being minced through a 5 mm screen. The minced meats were then added to the correct proportion of water and the whole was then heated to 90° C. with occasional stirring. When the mixture had attained a temperature of 90° C. the gravy powders were added, using the proportions given above, while the mixture was thoroughly macerated using a high-shear stirrer. During the addition of the gravy powders the temperature of the mixture was kept in the range 90°-95° C. When the gravy powders were evenly dispersed, the mixture was poured into an aluminium tray, covered and left to cool. When cool, the product was processed in a pressure cooker after which time the product was cooled.

When cool, the product was found to be tough, with a meaty appearance and could be cut cleanly into chunks with little or no fines being produced. The product resembled cooked lung.

The pH of the product was 6.4. The product was found to be thermally-irreversible when assessed in the following manner:

The product was cut into cubes of side-length about 25 mm and 250 g of the cubes were placed in a metal can. The can was then filled with water and sealed before being processed in a pressure cooker at 130° C. for one hour. The can was then cooled by immersion in cold, running water. When cool, the can was opened and the contents assessed. Thermo-irreversibility was confirmed since the chunks were still tough and discrete with clean surfaces after this treatment. Thermally-reversible chunks fuse together under the test conditions forming a single lump.

The structural integrity of the analogue is entirely due to the glucomannan and carrageenan present, since any contribution from the meats was destroyed by the 90° C. pre-heat treatment.

EXAMPLE 10

This example demonstrates the advantage of ageing the analogue mix prior to the heat forming process to improve the analogue toughness.

| | Ingredients | % by Weight |
| --- | --- | --- |
| Meats | Fibrous Muscle Meats | 27.3 |
| | Offal Meats | 16.2 |
| | Ground Bone | 6.5 |
| Gravy | Amorphophallus sp. extract | 0.75 |
| | kappa - carrageenan | 0.5 |
| | Water | 48.75 |
| | | 100.0 |

Using the above recipe the process of Example 1 was repeated up to and including the addition of the gums at 90° to 95°. When the gums were evenly dispersed, the mixture was split into two equal portions.

Product A

The hot mixture of one of the portions was poured into cans which were immediately sealed and transferred to a pre-heated autoclave. Without delay the cans and contents were heat sterilized at 130° C. for 50 minutes after which time they were cooled to room temperature by immersing in cold water. This product had had no ageing prior to the heat setting process.

Product B

The hot mixture of the second portion was poured into cans which were sealed and left to cool to room temperature overnight. After 12 hours at room temperature, the cans and contents were heat sterilized in a similar manner to Portion A. This product has been aged prior to the heat setting process.

The meat analogues resulting from Portion A and Portion B were cut into chunks and subjected to the test for thermo-irreversibility and described in Example 1.

Chunks from Product A were fused together to form a single lump. Some chunk definition was evident within the lump but the chunks were weak.

Chunks from Product B were discrete, had clean surfaces and were tougher than the chunks from Product A. The pH of both products was 6.5.

EXAMPLE 11

This example illustrates the preparation of a thermally irreversible meat analogue product using raw meats.

The product was prepared according to the following recipe:

| | Ingredients | % by Weight |
| --- | --- | --- |
| | Fish | 50 |
| Gravy | Water | 47.5 |
| | kappa - carrageenan | 1.0 |
| | Amorphophallus sp. extract | 1.5 |

| Ingredients | % by Weight |
|---|---|
| | 100.0 |

The fish was chopped and then minced through a 5 mm screen.

The gravy was prepared separately, by firstly heating the water to a temperature of 90° C. The water was maintained at this temperature while the Amorphophallus sp. extract and the kappa carrageenan were added and dispersed using a high shear mixer. When the powders were fully dispersed, the gravy was added to the minced fish and the resultant mixture was homogenized using a high shear mixer.

The product was then left to cool to room temperature before being processed in a pressure cooker at 110° C. for one hour. The product was finally allowed to cool to room temperature before being assessed for appearance, pH, toughness and thermo-irreversibility.

The thermally-irreversible product was tough with a texture similar to a meat loaf, the fish being evenly dispersed throughout the pack. The pH of the product was 7.1.

EXAMPLE 12

This example demonstrates the use of the glucomannan/carrageenan gel system to provide a meat analogue with high pet animal acceptance.

1. Analogue Preparation.

The following recipe was used:

| Ingredient | % w/w |
|---|---|
| Liver | 12 |
| Offal Meats | 28 |
| Fibrous Muscle Meat | 16 |
| Hydrated TVP | 10 |
| Condensed Whey | 3 |
| Carob gum | 0.5 |
| Flavouring salts | 0.2 |
| Dye Solution | 0.7 |
| Water | 26.5 |
| | 96.9 |

The ingredients were mixed together and minced through a 4 mm plate.

The minced product was stirred using a low shear mixer whilst adding 1.5% Amorphophallus extract and 1.6% commercial grade kappa carrageenan ensuring that the gums were well dispersed. The resulting mixture was heated in an autoclave for one hour at 130° C. in a suitable container.

After cooling, the solid pack was cut into chunks approximately 10 mm×7 mm×7 mm in size to provide the meat analogue.

2. Preparation of Pet Food.

The following recipes were used:

| Ingredients | Product A % w/w | Product B % w/w |
|---|---|---|
| Meat analogue (as above) | 70 | — |
| Gravy A | 30 | — |
| Raw Meat Mix (as in 1 above) | — | 97 |
| kappa Carrageenan (Commercial Grade) | — | 0.2 |
| Water | — | 2.8 |
| | 100.0 | 100.0 |

Gravy A

| Ingredient | % w/w |
|---|---|
| Water | 87.5 |
| Liver | 12 |
| Dye Solution | 0.3 |
| Flavour | 0.2 |
| | 100.0 |

The liver and flavour salts were added to the gravy to ensure that in Product A, the concentrations of these palatable ingredients were similar to those in Product B.

Product A

The appropriate weight of chunks analogue was added to the cans and the cans were filled with Gravy A to give the correct ratio of chunks to gravy. The can and contents were sealed.

Product B

All of the ingredients were mixed together and sealed in cans.

Both products were heat sterilized @130° C. for one hour. After cooling to room temperature the can were stored for one day at room temperature before opening to assess the contents. Samples of Product A and Product B were also fed to cats in a preference situation.

Product A consisted of tough, integral, well defined, chunks of meat in a weakly gelled gravy.

Product B consisted of a solid pack of minced meats embedded in a fairly tough clear thermo-reversible jelly.

To a human panel the chunks from Product A tasted similar to the Product B. There was no detectable flavour difference resulting from the inclusion of Amorphophallus extract and carrageenan as the binder system in Product A.

In Cat Preference trials, a panel of 40 felines ate both products with equal relish.

EXAMPLE 13

This example demonstrates the use of hot gum dispersion to aid the development of thermo-irreversible glucomannan/carrageenan gels.

Two meat analogue materials were prepared:
1. With gums mixed in the cold.
2. With gums mixed at elevated temperature.

Both had the following recipe:

| Ingredient | % by Weight |
|---|---|
| Offal Meats | 12.8 |
| Fibrous Muscle Meats | 22.0 |
| Ground Bone | 5.2 |
| Water | 57.5 |
| kappa - carrageenan | 1.0 |
| Amorphophallus sp. extract | 1.0 |
| | 100.0 |

For each meat analogue material, the meat constituents were roughly chopped, thoroughly mixed in their correct proportions and then minced employing the method illustrated in Example 1. The meat mix was then cooked by boiling in water for five minutes. The meats were strained, cooled to room temperature and employed in the following preparations:

1. Cold Gum Dispersal.

To 40 parts of the above meat mix 57.5 parts of water was added. The mixture was then thoroughly dispersed with a high sheer mixer. The required weights of gums were then dispersed into the mix whilst continually shearing for 1–2 minutes. The mixture was then poured into cans, sealed and sterilized at 130° C. for one hour.

2. Elevated Temperature Gum Dispersal.

To 40 parts of meat mix 57.5 parts of water was added.

The mixture was then heated to 90° C. whilst continually stirring with a high shear mixer. The gums were then dispersed into the mix using a high shear mixer and maintaining the temperature at 90° C. for 1–2 minutes. The mixture was then poured into cans, sealed and cooled to room temperature prior to being sterilized at 130° C. for one hour.

Both samples 1 and 2 were allowed to cool to room temperature after sterilization, before being assessed for thermo-irreversibility employing the method illustrated in Example 1.

Upon examination of the meat analogue chunks after the thermo-irreversibility test, obvious differences were apparent.

1. Cold Gum Dispersal.

The chunks had fixed together forming a continuous lump of meat and gel moulded to the shape of the can bottom. Gel had dissolved into the aqueous phase from the chunks producing a very viscous solution. The pH of the solid material was in the range of 6.30–6.38.

2. Hot Gum Dispersal.

The chunks were completely integral retaining their original shape before the test. They were glossy and juicy in appearance. The pH of the chunks was in the range 6.38–6.40. Some excess gel had diffused from the chunks to the aqueous phase to form a viscous solution.

EXAMPLE 14

This example illustrates the formation of thermo-irreversible gels employing a low temperature for a prolonged period of time.

Two 1 liter portions of gel were prepared having the following recipe:

| Ingredient | % w/w |
|---|---|
| 1. Amorphophallus sp. extract | 1.500 |
| 2. kappa carrageenan | 1.000 |
| 3. NaH$_2$PO$_4$2H$_2$O | 0.382 |
| 4. Na$_2$HPO$_4$ | 0.618 |
| 5. Water | 96.500 |
| | 100.000 |

The required quantity of water was taken for two liters of gel and heated to 90° C. The water was then mixed using a high shear stirrer and ingredients 3 and 4 added. Ingredients 1 and 2 were then added and mixing continued whilst maintaining a temperature of 90° C. for five minutes. The solution was divided into two equal parts, each being poured into an aluminium tray, covered and allowed to cool.

One of the trays containing the gel was then heated to 76.5° C. for a peiod of 16 hours, employing a constant temperature water bath and a thermocouple linked to a chart recorder to monitor the gel temperature. The gel was then allowed to cool to room temperature.

Both the heat treated and non heat treated gels were then assessed for thermo-irreversibility employing the method illustrated in Example 1.

Chunks from the non heat treated gel had completely fused together forming one continuous lump at the bottom of the can. The pH of the gel was 6.85.

Chunks from the heat treated gel remained totally integral and retained their original shape. The chunks were tough and glossy in appearance. Some gum had diffused from the chunks into the aqueous phase but this was not excessive.

pH of chunks = 7.01.

EXAMPLE 15

This example illustrates the effect of pH on the toughness of the thermally-irreversibility of the meat analogue product.

Two products were prepared using samples of offal meat from the same source. The products were prepared to the same recipe as that given in Example 3, except that the fish was replaced by the same proportion of offal meat.

The products were prepared in the same way as described in Example 3 except that prior to the addition of the gravy, the offal meat was treated with a suspension of calcium hydroxide in water to adjust the pH.

When the preparaion of the products was complete, they were assessed for pH and toughness. Product (A) had a pH of 6.85 was thermo-irreversible and was markedly tougher than product (B) which had a pH of 5.65 and was thermo-reversible.

EXAMPLE 16

This Example illustrates the minimum heat input required to product a thermo-irreversible gel.

A pH 7.1 buffer solution was prepared by dissolving the following salts in distilled water.

| Ingredient | Wt/g | % w/w |
|---|---|---|
| Na$_2$HPO$_4$ | 49.44 | 0.618 |
| NaH$_2$PO$_4$.2H$_2$O | 30.56 | 0.382 |
| Distilled Water | 7920.00 | 99.000 |
| | 8000.00 | 100.000 |

1 liter of pH 7.1 buffer solution was taken and heated to 90° C. The solution was then stirred employing a Silverson high shear mixer whilst maintaining the temperature at 90° C. 15 grams of knojac and 10 grams of carrageenan were then dispersed into the buffer solution and mixed thoroughly with the Silverson high shear mixer for a period of five minutes. During this time the solution temperature was maintained between 90°–95° C., after which the solution was poured into an aluminium tray, covered and allowed to cool to room temperature. A number of trays were made up in this manner and these were each heated for a period of 16 hours at a different temperature.

Two methods of heating were employed:
(i) 30°–80° C. using a constant temperaure water bath. The aluminium tray was submerged in the water to the upper level of gel. The gel temperature was then allowed to equilibrate with that of the water.
(ii) 80°–130° C. using an Astell autoclave, vented to give temperatures up to 100° C. maintaining atmospheric pressure and under elevated pressure to obtain temperatures up to 130° C.

The temperature of the gel was monitored in each case by means of a previously calibrated thermocouple linked to a twin channel chart recorder. A second thermocouple was also employed to monitor the temperature of the heating environment. Timing at any given temperature was started at the point where the gel temperature was in equilibrium with the heating environment.

The following heating conditions were employed.

| Temperature °C. | Time/Hours |
|---|---|
| 100 | 16 |
| 85 | 16 |
| 76.5 | 16 |
| 65 | 16 |
| 61.5 | 16 |
| *50 | 16 |
| 41 | 16 |

The gels produced were assessed for thermo-irreversibility and toughness employing the following methods:

Toughness

The gels were measured for toughness employing an Instron food tester.

The Instron food tester was set up as follows:

| Load cell | = | 50 Kg |
|---|---|---|
| Crosshead speed | = | 500 mm/minute |
| Chart speed | = | 1000 mm/minute |

The gel from each of the solutions prepared was emptied from its tray and the subjective textural characteristics of the gel were noted.

Part of the gel was then cut into cubes having approximate side length of 15 mm. 85-90 g of these cubes were transferred into a modified Minnesota cell which included a 10 mm screen. The chunks were then extruded through the screen by means of a plunger which was attached to the Instron load cell. The average toughness value was taken as the maximum load from the Instron recorder trace obtained. This procedure was repeated for four 85-90 g. quantities of chunks and the average toughness value taken.

Thermo-irreversibility

The remaining part of the gel was taken and cut into chunks of approximately 1" side. 250 g. of these chunks were placed in a steel can and the remaining volume made up with water. The can was then sealed and processed at 129° C. for 59 minutes in an Astell autoclave. It was then allowed to cool to room temperature prior to opening.

A thermo-irreversible gel is confirmed if the gel chunks have retained their integral shapes and are not fused together.

A thermo-reversible gel is identified if the gel chunks have melted and fused together in the bottom of the can.

pH values of the gels were measured both before and after the test for themo-irreversibility.

The results are illustrated in the following table:

Results

| Temp. °C. | Thermo-irreversibility | Colour | Toughness | pH |
|---|---|---|---|---|
| 100 | Yes | Opaque | 2.8 | 6.9 |
| 85 | Yes | Opaque | 4.7 | 7.0 |
| 76.5 | Yes | Opaque | 6.0 | 7.0 |

-continued

| Temp. °C. | Thermo-irreversibility | Colour | Toughness | pH |
|---|---|---|---|---|
| 65 | Yes | Opaque | 8.0 | 7.0 |
| 61.5 | Yes | Opaque | 10.0 | 7.0 |
| *50 | Yes/No | Opaque | 9.0 | 7.0 |
| 41 | No | Translucent | 6.6 | 7.1 |

*Several experiments were carried out employing 50° C./16 hours heating conditions which produced in some cases, gels which were borderline in terms of thermo-irreversibility and in other cases gels which were thermo-reversible. It can be concluded that the minimum heat input for thermo-irreversibility lies at about 50° C./16 hours.

EXAMPLE 17

In order to establish more clearly the effect of pH on the formation of thermo-irreversible gels in meat analogue materials a number of expeiments were carried out using meats at natural pH and at an artificially adjusted neutral pH. For the majority of the experiments the formulation used was as follows:

| Meat | 50% by weight |
|---|---|
| Konjac | 1.5% by weight |
| Carrageenan | 1% by weight |
| Water | 47.5% by weight. |

For one experiment using lung the amount of meat was reduced to 40% by weight and the water content increased accordingly.

The required amount of water for 1 Kg. of product was taken and heated to 90° C. This was then stirred with a Silverson high shear mixer during the addition of the required quantities of konjac and carrageenan. Stirring was continued until a homogeneous mix was obtained.

The required weight of meat was taken and mixed thoroughly with the aqueous gel blend. The resulting mix was spread evenly into an aluminium tray and allowed to cool.

The materials in the tray were heated to a temperature of 110° C. for a period of 60 minutes in an Astell laboratory autoclave. The trays were then allowed to cool prior to being tested for toughness, pH and thermo-irreversibility using the methods described in Example 8.

Results

| Meat | Thermo-irreversibility | pH | Chunk toughness/Kg. |
|---|---|---|---|
| Meat trimmings | No | 5.7 | 6.15 |
| Liver trimmings | No | 5.7 | 5.1 |
| Liver trimmings | Yes | 6.4 | 8.7 |
| Fish | Yes | 7.1 | 13.4 |
| Kidney | Yes | 7.3 | 7.3 |
| Lung | Yes | 7.2 | 11.7 |

In those cases where the pH is below 6 and thermo-irreversibility is not acheived the meat is at its natural pH. In those cases where the pH is above 6.4 and thermo-irreversibility is achieved the pH was initially adjusted to 7-7.5 by the addition of calcium hydroxide.

The results illustrate that when meat is present in the konjac-carrageenan gelling system pH is an important factor in determining whether the gel will be thermo-irreversible or not.

What is claimed is:

1. A food product having a pH not higher than 8 comprising a gelled aqueous phase and at least one other food material, said gelled phase comprising 0.01 to 5 percent by weight of a mixture or reaction product of at least one glucomannan and at least one carrageenan in a ratio of glucomannan to carrageenan from 20:1 to 1:20.

2. The food product of claim 1 wherein said glucomannan is derived from an Amorphophallus species.

3. The food product of claim 1 wherein the gelled aqueous phase is thermo-irreversible.

4. The food product of claim 3 wherein the gelled phase is in the form of chunks or lumps.

5. The food product of claim 4 wherein the other food material comprises flavouring and/or colourings such as to impart the flavour and appearance of meat to the gelled phase.

6. The food product of claim 1 wherein the gelled aqueous phase is a thermo-reversible gel.

7. The food product of claim 6 wherein the other food material is meat.

8. The food product of claim 6 wherein the food product is a dessert gel.

9. The food product of claim 1 having a pH within the range of from 5 to 8.

10. The food product of claim 6 having a pH within the range from 3 to 6.

11. The food product of claim 1, wherein the ratio of glucomannan to carrageenan is within the range of from 1:10 to 10:1.

12. The food product of claim 1, wherein the concentration of total amount of glucomannan and carrageenan in the aqueous phase is from 0.01% to 5% by weight of the aqueous phase.

13. The food product of claim 1, wherein the carrageenan contains at least some kappa carrageenan.

14. The food product of claim 1, wherein the glucomannan is a glucomannan from the corms of the Amorphophallus genus.

15. A method for making a food product which comprises mixing a gelling agent of a combination of at least one glucomannan and at least one carrageenan to other edible materials and heating the thus prepared mixture at a temperature of at least 100° C. at a pH not higher than 8 for sufficient time to cause formation of a gelled or thickened aqueous phase in the material.

16. The method of claim 15 wherein the other food materials are selected from the group consisting of meats and other proteinaceous materials of vegetable and/or animal origin wherein heating is continued whereby the product forms a proteinaceous material in a thermo-reversible gelled aqueous phase.

17. A process for the production of a food product comprising heating a mixture of at leat the glucomannan and at least one carrageenan in water, with flavourings and/or colourings, at a temperature of at least 100° C. at a pH not higher than 8 for a time sufficient to produce a thermo-irreversible gel.

18. A process for the production of an edible product having a pH between 5 to 8 and having a gelled aqueous phase provided by a mixture of at leat one glucomannan and at least one carrageenan, which comprises subjecting a gellable combination of at least one glucomannan and at least one carrageenan to a temperature of at least 50° C. for a period of up to 16 hours such as to form a thermo-irreversible gel in the aqueous phase.

19. A process as claimed in claim 18 wherein the gelling system is produced by dissolving the carrageenan and glucomannan in a hot aqueous phase which is then cooled and then reheated to form the thermo-irreversible gel.

20. A process as claimed in claim 19 wherein before being reheated to form the thermo-irreversible gel the solution is held at room temperature for an aging period.

21. A process as claimed in claim 18 wherein the glucomannan is a glucomannan present in the corms of the Amorphophallus genus.

22. A process as claimed in claim 21 wherein the glucomannan is a glucomannan derived from *A.rivieri, A.oncophyllus, A.variabilis, A.bulbifera* or *A.blumei.*

23. A process as claimed in claim 18 wherein the carrageenan is a carrageenan type containing at least some kappa carrageenan.

24. A process as claimed in claim 18 wherein the ratio of glucomannan to carrageenan is in the range of 20:1 to 1:20.

25. A process as claimed in claim 18 wherein the concentration of the mixture of glucomannan and carrageenan in the aqueous phase is from 0.01% to 5% by weight.

26. A process as claimed in claim 18 wherein the concentration of the mixture of glucomannan to carrageenan in the aqueous phase is from 0.5 to 5% by weight.

27. A meat analogue comprising proteinaceous material dispersed in and bound together by a thermo-irreversible gelled aqueous phase, wherein the gelling system comprises a mixture of at least one glucomannan and at least one carrageenan.

* * * * *